United States Patent
Beach

(10) Patent No.: US 11,090,811 B2
(45) Date of Patent: *Aug. 17, 2021

(54) METHOD AND APPARATUS FOR LABELING OF SUPPORT STRUCTURES

(71) Applicant: Zebra Technologies Corporation, Lincolnshire, IL (US)

(72) Inventor: Robert E. Beach, Los Altos, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 150 days.

This patent is subject to a terminal disclaimer.

(21) Appl. No.: 16/189,783

(22) Filed: Nov. 13, 2018

(65) Prior Publication Data

US 2020/0147802 A1    May 14, 2020

(51) Int. Cl.
| | | |
|---|---|---|
| *B25J 9/16* | (2006.01) | |
| *B25J 19/02* | (2006.01) | |
| *B25J 11/00* | (2006.01) | |
| *B65C 9/40* | (2006.01) | |

(52) U.S. Cl.
CPC .............. *B25J 9/1697* (2013.01); *B25J 11/00* (2013.01); *B25J 19/021* (2013.01); *B65C 9/40* (2013.01)

(58) Field of Classification Search
CPC .............. B25J 9/16; B25J 19/02; B25J 11/00
See application file for complete search history.

(56) References Cited

U.S. PATENT DOCUMENTS

| | | |
|---|---|---|
| 5,209,712 A | 5/1993 | Ferri |
| 5,214,615 A | 5/1993 | Bauer |
| 5,408,322 A | 4/1995 | Hsu et al. |
| 5,414,268 A | 5/1995 | McGee |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

Ross Horrigan, "Industry Solutio: 3D visions helps robots apply label to produce"; 14 pages (Year: 2015).*

(Continued)

*Primary Examiner* — Kira Nguyen
(74) *Attorney, Agent, or Firm* — Yuri Astvatsaturov

(57) ABSTRACT

An apparatus for labeling support structures includes: a chassis having a locomotive assembly; an effector assembly having a first end coupled to the chassis and a second end movable relative to the chassis; a label modification unit at the second end of the effector assembly, the label modification unit including an image sensor; and a controller coupled to the locomotive assembly, the effector assembly and the label modification unit, the controller configured to: obtain label modification data defining a location of a low powered display relative to a reference feature on a support structure for modifying content displayed by the display; control the locomotive assembly to travel to the support structure; detect the reference feature via image data captured at the image sensor; control the effector assembly to place the label modification unit at the location; and control the effector assembly and the label modification unit to modify the content.

24 Claims, 9 Drawing Sheets

(56) References Cited

U.S. PATENT DOCUMENTS

| | | |
|---|---|---|
| 5,534,762 A | 7/1996 | Kim |
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | MacIntosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | Deluca |
| 10,352,689 B2 | 7/2019 | Brown et al. |
| 10,373,116 B2 | 8/2019 | Medina et al. |
| 10,394,244 B2 | 8/2019 | Song et al. |
| 10,552,938 B2 * | 2/2020 | Morphet ............... G06T 15/005 |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |
| 2005/0213082 A1 | 9/2005 | Dibernardo et al. |

(56) References Cited

U.S. PATENT DOCUMENTS

| | | |
|---|---|---|
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197439 A1* | 8/2012 | Wang .................. G05D 1/0038 700/259 |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |

(56) References Cited

U.S. PATENT DOCUMENTS

| | | |
|---|---|---|
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0235157 A1 | 8/2015 | Avegliano et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323253 A1* | 11/2017 | Enssle ................. G06K 9/3241 |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1* | 4/2018 | Paat ........................ H04N 7/185 |
| 2018/0108134 A1 | 4/2018 | Venable et al. |
| 2018/0114183 A1 | 4/2018 | Howell |
| 2018/0130011 A1* | 5/2018 | Jacobsson ............ G06Q 10/087 |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0276596 A1 | 9/2018 | Murthy et al. |
| 2018/0281191 A1 | 10/2018 | Sinyayskiy et al. |
| 2018/0293442 A1 | 10/2018 | Fridental et al. |
| 2018/0293543 A1* | 10/2018 | Tiwari .................... H04W 4/35 |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0370727 A1 | 12/2018 | Hance et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1* | 3/2019 | Shibasaki ................ B25J 9/163 |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0178436 A1 | 6/2019 | Mao et al. |
| 2019/0180150 A1 | 6/2019 | Taylor et al. |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |
| 2020/0314333 A1 | 10/2020 | Liang et al. |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| JP | 2014170431 | 9/2014 |
| KR | 101234798 | 1/2009 |
| KR | 1020190031431 | 3/2019 |
| WO | WO 99/23600 | 5/1999 |

(56) References Cited

FOREIGN PATENT DOCUMENTS

| | | |
|---|---|---|
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

International Search Report and Written Opinion for International Application No. PCT/US2019/051312 dated Nov. 15, 2019.

Meyersohn. Walmart turns to robots and apps in stores, Dec. 7, 2018, retrieved from the Internet at <URL:https://www.cnn.com/2018/12/07/business/walmart-robot-janitors-dotcom-store/index.html> on Oct. 29, 2019.

Notice of allowance for U.S. Appl. No. 15/211,103 dated Apr. 5, 2017.

Olson, Clark F., etal. "Wide-Baseline Stereo Vision for terrain Mapping" in Machine Vision and Applications, Aug. 2010.

Oriolo et al., "An iterative learning controller for nonholonomic mobile Robots", the international Journal of Robotics Research, Aug. 1997, pp. 954-970.

Ostafew et al., "Visual Teach and Repeat, Repeat, Repeat: Iterative learning control to improve mobile robot path tracking in challenging outdoor environment", IEEE/Rsj International Conference on Intelligent robots and Systems, Nov. 2013, pgs. 176-.

Park et al., "Autonomous mobile robot navigation using passive rfid in indoor environment," IEEE, Transactions on industrial electronics, vol. 56, issue 7, pp. 2366-2373 (Jul. 2009).

Perveen et al. (An overview of template matching methodologies and its application, International Journal of Research in Computer and Communication Technology, v2n10, oct. 2013) (Year: 2013).

Pivtoraiko et al., "Differentially constrained mobile robot motion planning in state lattices", journal of field robotics, vol. 26, No. 3, 2009, pp. 308-333.

Pratt W K Ed: "Digital Image processing, 10-image enhancement, 17-image segmentation", Jan. 1, 2001, Digital Image Processing: PIKS Inside, New York: John Wily & Sons, US pp. 243-258, 551.

Puwwin, J., et al."Robust Multi-view camera calibration for wide-baseline camera networks",in IEEE Workshop on Applications of computer vision (WACV), Jan. 2011.

Rusu, et al. "How to incrementally register pairs of clouds," PCL Library, retrieved from internet on Aug. 22, 2016 [http://pointclouds.org/documentation/tutorials/pairwise_incremental_registration.php.

Rusu, et al. "Spatial Change detection on unorganized point cloud data," PCL Library, retrieved from internet on Aug. 19, 2016 [http://pointclouds.org/documentation/tutorials/octree_change.php].

Schnabel et al. "Efficient RANSAC for Point-Cloud Shape Detection", vol. 0, No. 0, pp. 1-12 (1981).

Senthilkumaran, et al., "Edge Detection Techniques for Image Segmentation-A Survery of Soft Computing Approaches", International Journal of Recent Trends in Engineering, vol. 1, No. 2 (May 2009).

Szeliski, "Modified Hough Transform", Computer Vision. Copyright 2011, pp. 251-254. Retrieved on Aug. 17, 2017 [http://szeliski.org/book/drafts/SzeliskiBook)20100903_draft.pdf].

Tahir, Rabbani, et al., "Segmentation of point clouds using smoothness constraint",International Archives of Photogrammetry, Remote Sensing and Spatial Information Sciences 36.5 (Sep. 2005): 248-253.

Trevor et al., "Tables, Counter, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf.

Tseng, et al., "A Cloud Removal Approach for Aerial Image Visualization", International Journal of Innovative Computing, Information & Control, vol. 9, No. 6, pp. 2421-2440 (Jun. 2013).

Uchiyama, et al., "Removal of Moving Objects from a Street-View Image by Fusing Multiple Image Sequences", Pattern Recognition, 2010, 20th International Conference On, IEEE, Piscataway, NJ pp. 3465-2459 (Aug. 23, 2010).

United Kingdom Intellectual Property Office, "Combined Search and Examination Report" for GB Patent Application No. 1813580.6 dated Feb. 21, 2019.

United Kingdom Intellectual Property Office, Combined Search and Examination Report dated Jan. 22, 2016 for GB Patent Application No. 1417218.3.

United Kingdom Intellectual Property Office, Combined Search and Examination Report dated Jan. 22, 2016 for GB Patent Application No. 1521272.3.

United Kingdom Intellectual Property Office, Combined Search and Examination Report dated Mar. 11, 2015 for GB Patent Application No. 1417218.3.

United Kingdom Intellectual Property Office, Combined Search and Examination Report dated May 13, 2020 for GB Patent Application No. 1917864.9.

Varol Gul et al: "Product placement detection based on image processing", 2014 22nd Signal Processing and Communication Applications Conference (SIU), IEEE, Apr. 23, 2014.

Varol Gul et al: "Toward Retail product recognition on Grocery shelves", Visual Communications and image processing; Jan. 20, 2004; San Jose, (Mar. 4, 2005).

Weber et al., "Methods for Feature Detection in Point clouds," visualization of large and unstructured data sets—IRTG Workshop, Pp. 90-99 (2010).

Zhao Zhou et al.: "An Image contrast Enhancement Algorithm Using PLIP-based histogram Modification", 2017 3rd IEEE International Conference on Cybernetics (CYBCON), IEEE, (2017-06-21).

Ziang Xie et al., "Multimodal Blending for High-Accuracy Instance Recognition", 2013 IEEE RSJ International Conference on Intelligent Robots and Systems, p. 2214-2221.

Fan Zhang et al., "Parallax-tolerant Image Stitching", 2014 Computer Vision Foundation, pp. 4321-4328.

Kaimo Lin et al., "Seagull: Seam-guided Local Alignment for Parallax-tolerant Image Stitching", Retrieved on Nov. 16, 2020 [http://publishillinois.edu/visual-modeling-and-analytics/files/2016/08/Seagull.pdf].

Julio Zaragoza et al., "As-Projective-As-Possible Image Stitching with Moving DLT", 2013 Computer Vision Foundation, pp. 2339-2346.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference on, EE, Piscataway, NJ, pp. 53-58 (Jun. 13, 2010).

Glassner, "Space Subdivision for Fast Ray Tracing." IEEE Computer Graphics and Applications, 4.10, pp. 15-24, 1984.

Golovinskiy, Aleksey, et al. "Min-Cut based segmentation of point clouds." Computer Vision Workshops (ICCV Workshops), 2009 IEEE 12th International Conference on. IEEE, 2009.

(56) References Cited

OTHER PUBLICATIONS

Hackel et al., "Contour Detection in unstructured 3D point clouds,"IEEE, 2016 Conference on Computer vision and Pattern recognition (CVPR), Jun. 27-30, 2016, pp. 19.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/U52013/070996 dated Apr. 2, 2014.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/U52020/028183 dated Jul. 24, 2020.
International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n. 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM Siggraph Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-S/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM Siggraph Computer Graphics, vol. 19, No. 3, ACM, pp. 61-67, 1985.
Li et al., "An improved Ransac for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 37, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 19, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Fagade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing ACM SIGGRAPH Computer Graphics", vol. 18, No. 3, ACM pp. 137-145, 1984.
Datta, A., et al. "Accurate camera calibration using iterative refinement of control points," in Computer Vision Workshops (ICCV Workshops), 2009.

(56) References Cited

OTHER PUBLICATIONS

Deschaud, et al., "A Fast and Accurate Place Detection algoritm for large noisy point clouds using filtered normals and voxel growing," 3DPVT, May 2010, Paris, France.

Douillard, Bertrand, et al. "On the segmentation of 3D Lidar point clouds." Robotics and Automation (ICRA), 2011 IEEE International Conference on IEEE, 2011.

Dubois, M., et al., "A comparison of geometric and energy-based point cloud semantic segmentation methods," European Conference on Mobile Robots (ECMR), pp. 88-93, 2527, Sep. 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

\* cited by examiner

METHOD AND APPARATUS FOR LABELING OF SUPPORT STRUCTURES

BACKGROUND

Environments in which inventories of objects are managed, such as products for purchase in a retail environment, may be complex and fluid. A retail facility may contain a wide variety of products disposed on support structures such as shelves, which bear labels containing product information such as prices, barcodes and the like. The modification of products within the facility, the selection of products on the shelves, and the formatting of the labels, may all change over time, requiring previous labels to be replaced with new labels. The modification of labels is typically performed manually, in a time-consuming and error-prone process. Similar issues may be present in other environments in which inventoried objects are managed, such as in warehouse environments.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
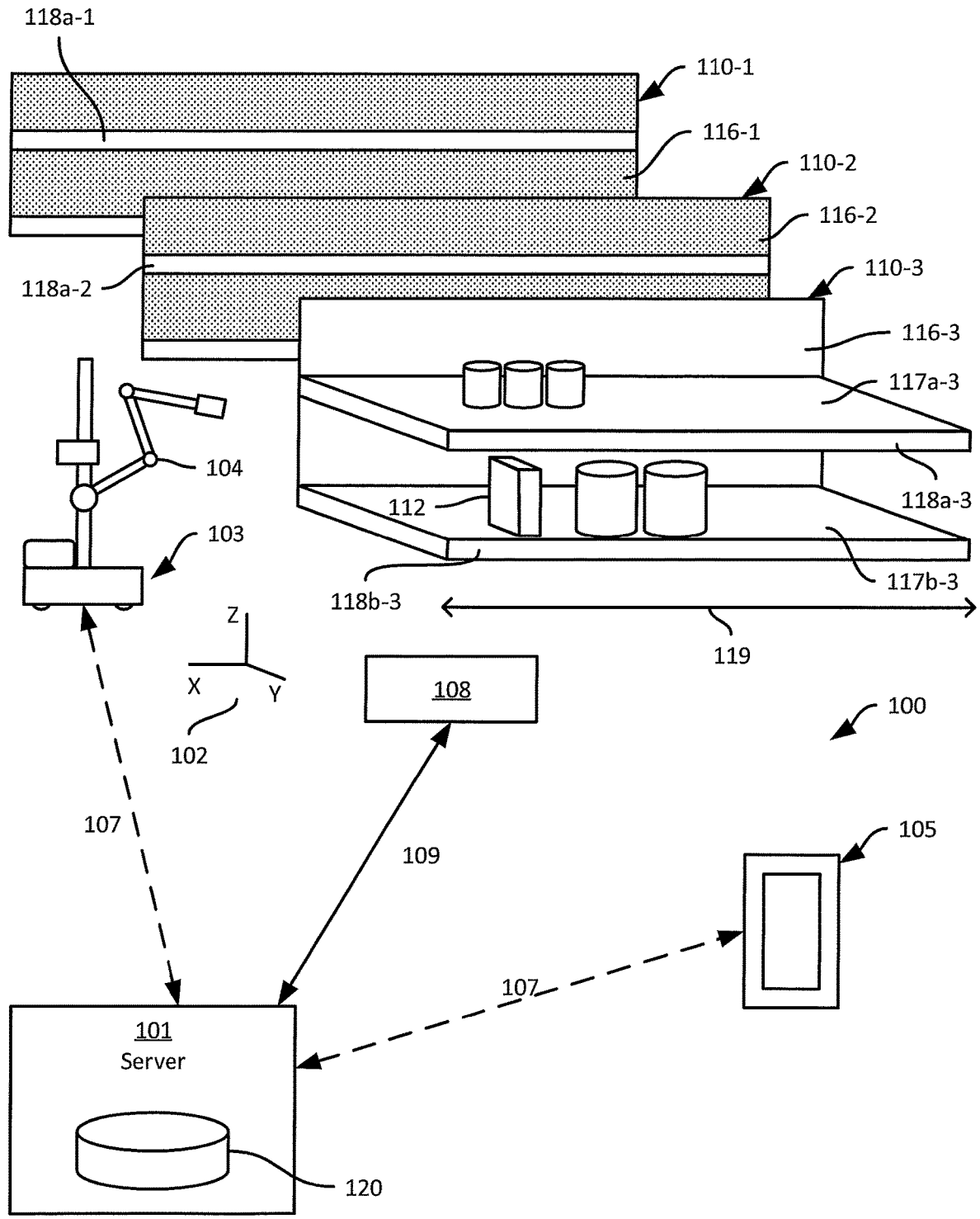
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an apparatus for labeling support structures. The apparatus includes a chassis having a locomotive assembly; an effector assembly having a first end coupled to the chassis and a second end movable relative to the chassis; a label modification unit at the second end of the effector assembly, the label modification unit including an image sensor; and a controller coupled to the locomotive assembly, the effector assembly and the label modification unit. The controller is configured to obtain label modification data defining a location relative to a reference feature on a support structure for a label modification operation; control the locomotive assembly to travel to the support structure; detect the reference feature via image data captured at the image sensor; control the effector assembly to place the label modification unit at the location relative to the reference feature; and control the effector assembly and the label modification unit to perform the label modification operation.

Additional examples disclosed herein are directed to a method of modifying low powered displays on support structures, comprising: at a controller of an apparatus: obtaining label modification data defining a location of a low powered display relative to a reference feature on a support structure for modifying content displayed by the low powered display; controlling a locomotive assembly of the apparatus to travel to the support structure; detecting the reference feature in an image captured at an image sensor of the apparatus; controlling an effector assembly of the apparatus to place the label modification unit at the location relative to the reference feature; and controlling effector assembly and the label modification unit to modify content displayed by the low powered display.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within a retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link. As those of ordinary skill in the art will realize, alternatively or in addition to the retail environment, embodiments of the present disclosure may be implemented in a variety of environments in which inventoried objects are managed, such as in a warehouse environment.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of support structures in the form of shelf modules 110-1, 110-2, 110-3 and so on (collectively referred to as shelf modules 110, and generically referred to as a shelf module 110—this nomenclature is also employed for other elements discussed herein). Various other support structures for supporting inventoried retail and/or warehouse items disposed thereon are contemplated, including shelves, racks (including racks for hanging inventoried objects, such as clothing racks), peg boards, and the like.

Each shelf module 110 supports a plurality of products 112. Each shelf module 110 includes a shelf back 116-1, 116-2, 116-3 and one or more support surfaces (e.g. an upper support surface 117a-3 and a lower support surface 117b-3 as illustrated in FIG. 1) extending from the shelf back 116 to a respective shelf edge (e.g. shelf edges 118a-1, 118a-2, 118a-3 and 118b-3). The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. The shelf edges 118 typically bear labels corresponding to the products 112 and therefore including information such as product names, barcodes or other machine-readable indicators, prices, and the like.

The labels can include adhesive labels affixed to the shelf edges 118, rewriteable media, low powered displays supported on the shelf edges 118 (e.g. by adhesives or the like), or other suitable labels. The discussion below refers to low powered displays acting as electronic shelf labels supported on the shelf edges 118. In some examples, a low powered display may extend across a shelf edge 118, or a portion thereof, and define multiple electronic labels corresponding to respective products 112. In other examples, the shelf edge 118 may support multiple discrete low powered displays each defining separate labels corresponding to respective products. In other words, the term "label" as employed herein can refer to either a discrete low powered display, or to a region of a strip of a low powered display that defines several such regions (i.e. several labels). The low powered displays may be, for example, zero-power liquid crystal displays, electronic paper or other suitable low powered displays which, after updating the display to display content data, use little to no power maintain the content data on the display.

As will be apparent from FIG. 1, the term "shelf edge" 118 as employed herein, which may also be referred to as the edge of a support surface of a support structure (e.g., the support surfaces 117) refers to a surface bounded by adjacent surfaces having different angles of inclination. In the example illustrated in FIG. 1, the shelf edges 118a-3 is at an angle of about ninety degrees relative to each of the support surface 117a-3 and the underside (not shown) of the support surface 117a-3. In other examples, the angles between the shelf edges 118 and the adjacent surfaces, such as the support surfaces 117, is more or less than ninety degrees.

In the illustrated embodiment, the apparatus 103 is deployed within the retail environment, and communicates with the server 101 (e.g. via the link 107) to navigate, autonomously or partially autonomously, along a length 119 of at least a portion of the shelf modules 110. The apparatus 103 is configured to navigate among the shelf modules 110, for example according to a frame of reference 102 established within the retail environment. The frame of reference 102 can also be referred to as a global frame of reference. The apparatus 103 is configured, during such navigation, to track the location of the apparatus 103 relative to the frame of reference 102. In other words, the apparatus 103 is configured to perform localization. The apparatus 103 is equipped with one or more navigation sensors, including but not limited to image sensors, depth sensors, as well as gyroscopes and/or accelerometers, enabling the apparatus 103 to navigate within the environment.

The apparatus 103 also includes an effector assembly 104 bearing a label modification unit, to be discussed in greater detail below. The apparatus 103 is configured, for example responsive to commands received from the server 101, to navigate among the shelf modules 110 and modify the above-mentioned labels on the shelf edges 118 with the effector assembly 104 and associated components. For example, certain labels may require periodic modification to reflect updated prices, reallocation of products 112 among the shelf modules 110, and the like. The server 101 includes a memory storing a repository 120 containing label modification data, for example in the form of a planogram indicating the locations (e.g. in the frame of reference 102) of each shelf module 110, as well as the location of each low powered display on each shelf module. Display locations may be expressed in the repository as a distance along a specified shelf edge 118 relative to a reference feature of the module 110, such as the boundary of the module 110 (e.g. the left side of the module 110). In particular, the display locations may represent the locations of a charging region of the low powered display (e.g. contacts for contact charging, or reception coils for wireless charging). The label modification data in the repository 120 can also contain further data defining each label, the content data (i.e. the content with which the display is to be updated), the product identifier corresponding to the label, and the like.

Figure 2A:
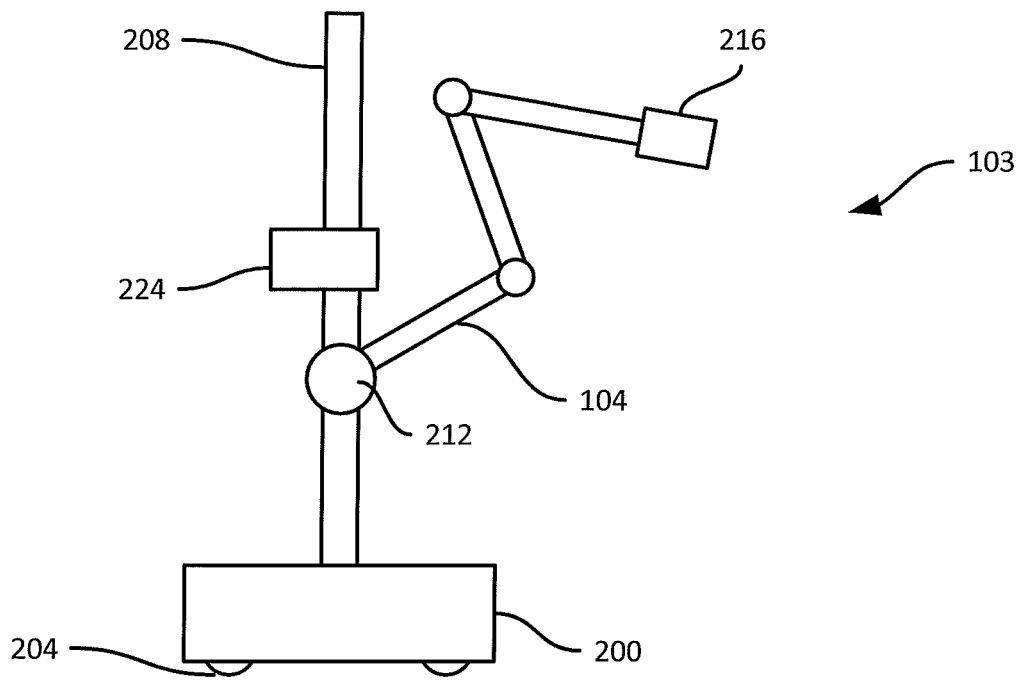
FIG. 2A depicts a mobile automation apparatus in the system of FIG. 1.
Figure 2B:
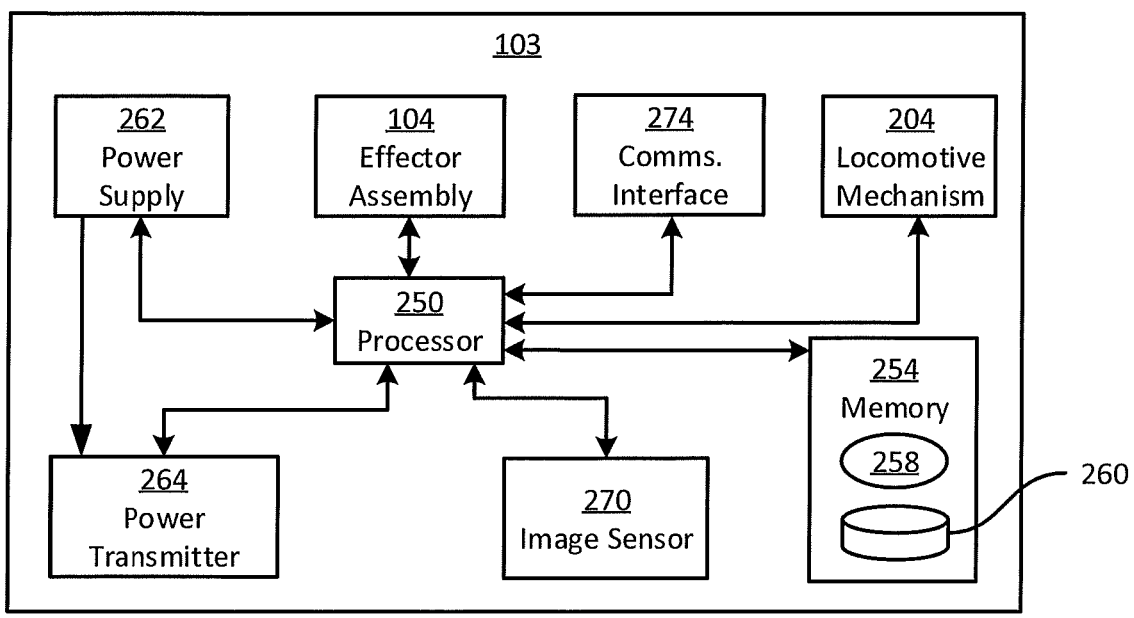
FIG. 2B is a block diagram of certain internal components of the mobile automation apparatus in the system of FIG. 1.

Turning now to FIGS. 2A and 2B, the mobile automation apparatus 103 is shown in greater detail. Referring to FIG. 2A, the apparatus 103 includes a chassis 200 containing a locomotive mechanism 204 (e.g. one or more electrical motors driving wheels, tracks or the like). The chassis 200 supports additional components of the apparatus 103, including a mast 208 which in turn supports the effector assembly 104. The effector assembly 104, in the present example, is a robotic arm fixed to the chassis 200 (via the mast 208) at a first end 212. A second end of the effector assembly 104 is movable relative to the chassis 200, for example with six degrees of freedom (e.g. translations in three dimensions, as well as roll, pitch and yaw angles). The second end of the effector assembly 104 carries a label modification unit 216. As will be discussed in greater detail below, the label modification unit 216 is configured to modify the content displayed on the low powered display, as well as to capture data (e.g. image data) for use in positioning the modification unit 216 via control of the effector assembly 104.

The apparatus 103 also includes components for controlling and interacting with the above components to modify labels on the shelf edges 118. Turning to FIG. 2B, the apparatus 103 includes a special-purpose controller, such as a processor 250 interconnected with a non-transitory computer readable storage medium, such as a memory 254. The memory 254 includes a combination of volatile memory (e.g. Random Access Memory or RAM) and non-volatile memory (e.g. read only memory or ROM, Electrically Erasable Programmable Read Only Memory or EEPROM, flash memory). The processor 250 and the memory 254 each comprise one or more integrated circuits.

The memory 254 stores computer readable instructions for execution by the processor 250. In particular, the memory 254 stores a control application 258 which, when executed by the processor 250, configures the processor 250 to perform various functions discussed below in greater detail and related to the navigation of the apparatus 103 (e.g. by controlling the locomotive mechanism 204). The application 258 may also be implemented as a suite of distinct applications in other examples. The processor 250, when so configured by the execution of the application 258, may also be referred to as a controller 250. Those skilled in the art will appreciate that the functionality implemented by the processor 250 via the execution of the application 258 may also be implemented by one or more specially designed hardware and firmware components, such as field-configurable gate arrays (FPGAs), application-specific integrated circuits (ASICs) and the like in other embodiments.

The memory 254 also stores a repository 260 containing, for example, a map of the environment in which the apparatus 103 is deployed, for use in navigation among the shelf modules 110. The apparatus 103 may communicate with the server 101, for example to receive instructions to navigate to specified locations (e.g. to a given aisle consisting of a set of modules 110) and initiate label modification operations. Navigation to the specified module 110 is implemented by the apparatus 103 based in part on the above-mentioned map. The repository 260 can also contain label modification data (e.g. received from the server 101) for use in modifying the low powered displays on the shelf modules 110.

As shown in FIG. 2B, the processor 250 is connected to the effector assembly 104 and the locomotive mechanism 204. The processor 250 is enabled, via such connections, to issue commands to the effector assembly 104 to control the position of the label modification unit 216 relative to the chassis 200. In addition, the apparatus 103 includes a power supply 262, a power transmitter 264 and an image sensor 270 implemented as components of the modification unit 216.

The power supply 262 is configured to supply power to be transmitted to the low powered display during updates to the low powered display. The power supply 262 is therefore also coupled to the power transmitter 264. The power supply 262 may be configured to supply alternating current (AC) or direct current (DC) according to the type of current required by the power transmitter 264 to transmit power to the low powered display. The power transmitter 264 can be configured to transmit power from the power supply 262 to the low powered display via direct contact or wirelessly.

Figure 3A:
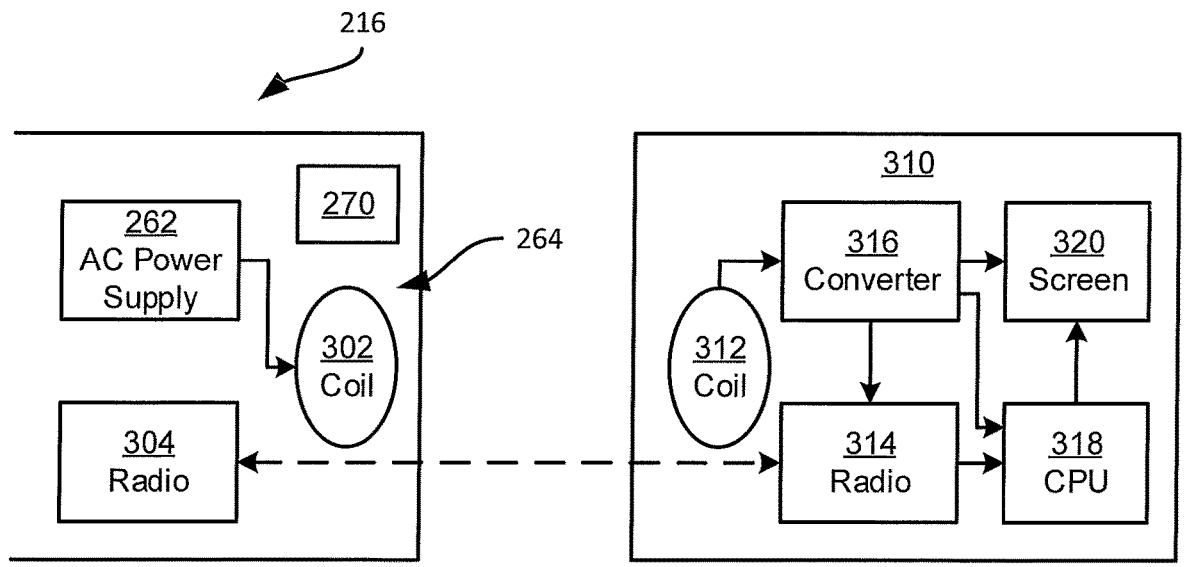
FIG. 3A is a side view of an example label modification unit of the mobile automation apparatus in the system of FIG. 1.

Referring to FIG. 3A, an example embodiment of the modification unit 216 is depicted. The modification unit 216 is configured to wirelessly supply power to the low powered display. In particular, the power transmitter 264 includes a coil 302 through which an alternating current may be applied by the power supply 262 to induce a magnetic field for wirelessly providing power to a low powered display 310. The display 310, in turn, includes a reception coil 312 for receiving the alternating field and a converter 316 including suitable circuitry to convert the magnetic field to DC power for modifying the displayed content. The DC power may then be distributed from the converter 316 to other components of the display 310, such as a CPU 318, a screen 320, and the like, for performing the modification operations. In some implementations, the coil 302 may be shaped to induce a magnetic field which extends length-wise along the shelf edge 118, to allow multiple displays to be powered and updated simultaneously.

The modification unit 216 further includes a radio transceiver 304 coupled to the processor 250. The processor 250 is configured to control the radio transceiver 304 to transmit content data extracted from the label modification data to the display 310. The display 310 includes a display radio 314 to receive the content data from the radio 304, via a near-field communication or another suitable low power wireless communication. The display radio 314 may be powered by the DC power received from the modification unit 216. In some examples, the power transmitter 264 can include a combiner or a multiplexer configured to combine or select signals from the power supply 262 and the content data from the processor 250. The power transmitter 264 can thus be configured to transmit both power and content data using the coil 302. In such implementations, the display 310 further includes a separator to separate the power and the content data.

Figure 3B:
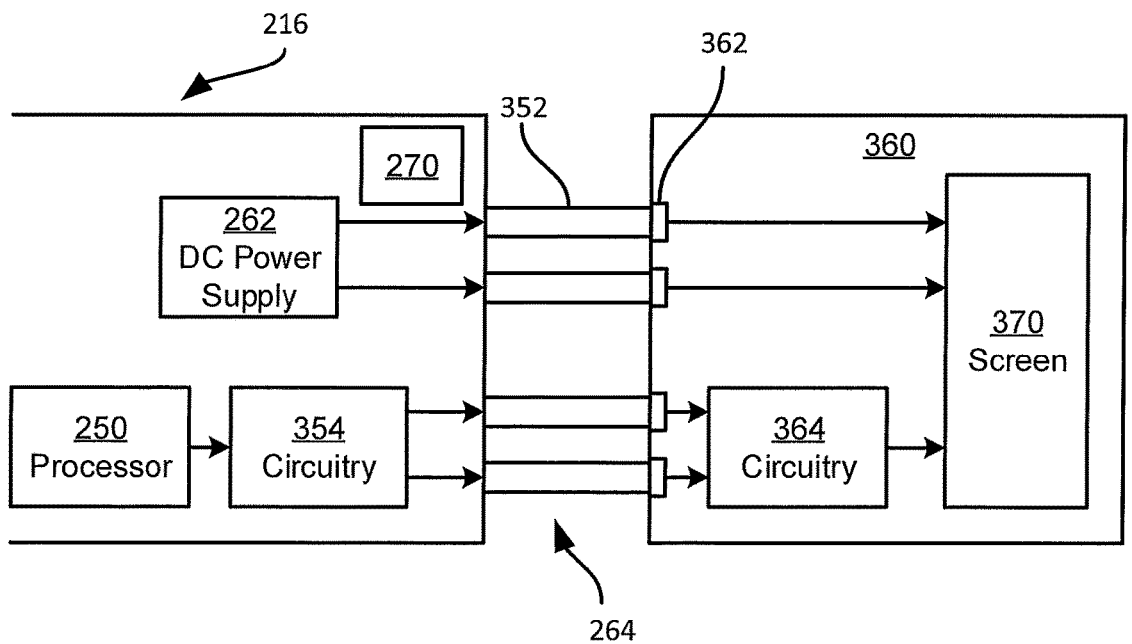
FIG. 3B is a side view of another example label modification unit of the mobile automation apparatus in the system of FIG. 1.

Referring now to FIG. 3B, another example embodiment of the modification unit 216 is depicted. The modification unit 216 is configured to supply power to a low powered display 360 via direct contact. In particular, the power transmitter 264 includes probes 352 extending from the modification unit 216. The probes 352 are configured to mate with contacts 362 of the display 360 to transmit power to the display 360 via direct contact. The contacts 362 can be coupled with other components of the display 360, such as a screen 370, for performing the modification operations.

The modification unit 216 further includes interface circuitry 364 configured to receive content data from the processor 250 and transmit the content data to the display 360 via the probes 352. In some implementations, the content data and the power may be transmitted via separate probes 352. In other implementations, the power transmitter 264 further includes a combiner configured to combine signals from the power supply 262 and the content data from the processor 250. The power transmitter 264 can thus be configured to transmit both power and content data over the same probes 352. In such implementations, the display 360 further includes a separator to separate the power and the content data.

Returning to FIG. 2B, the image sensor 270 can be for example a digital color camera (e.g. configured to generate RGB images), a greyscale camera, an infrared camera, an ultraviolet camera or a combination of the above. The image sensor 270 is controllable by the processor 250 to capture images of the shelf modules 110 in order to locate the modification unit 216 and modify labels on the shelf edges 118. As depicted in FIGS. 3A and 3B, the image sensor 270 is implemented as a component of the modification unit 216. The image sensor 270 is oriented to capture images depicting portions of the environment toward which the modification unit 216 is currently oriented (i.e. towards the low powered display).

Returning to FIG. 2B, the apparatus 103 also includes a communications interface 274 enabling the apparatus 103 to communicate with other computing devices, such as the server 101 over the link 107 shown in FIG. 1. The communications interface 274 also enables the apparatus 103 to communicate with the server 101 via the dock 108 and the link 109.

Figure 4:
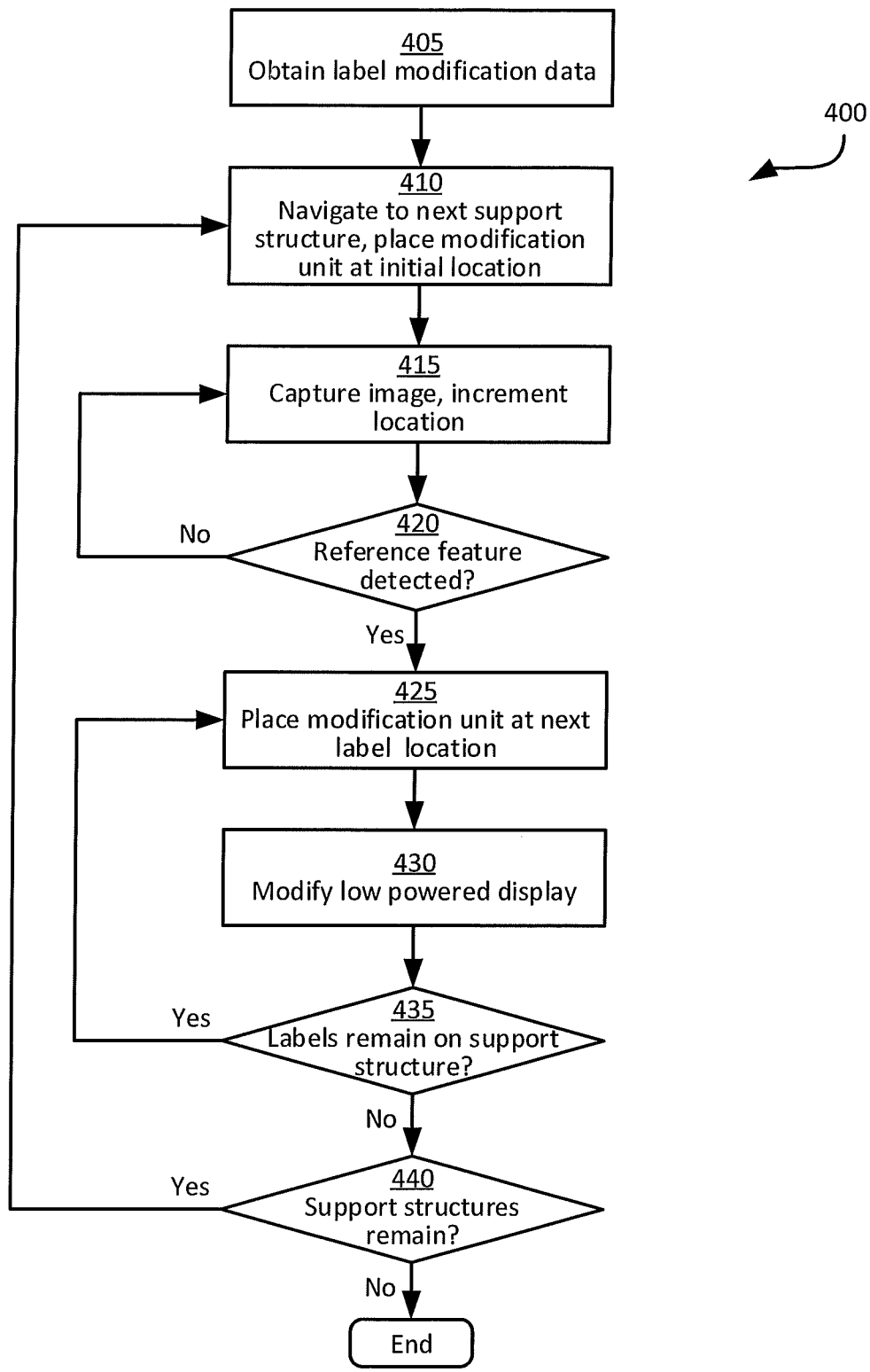
FIG. 4 is a flowchart of a method for updating low powered displays on support structures.

The functionality of the apparatus 103, as implemented via execution of the application 258 by the processor 250 will now be described in greater detail, with reference to FIG. 4. FIG. 4 illustrates a method 400 of labeling support structures, which will be described in conjunction with its performance in the system 100, and in particular by the apparatus 103, with reference to the components illustrated in FIGS. 2A, 2B, 3A and 3B.

At block 405, the apparatus 103 is configured to obtain label modification data. The label modification data can be obtained from the server 101 over the link 107 or via the dock 108. In other examples, the label modification data can be received from the client device 105. The label modification data defines at least one location in the facility for performance of a label modification operation, such as modification of a low powered display to replace previous label content at the location with new label content, writing of a label in a previously unlabeled location, or erasure of a previous label, without placement of a new label. In the present example, the locations are locations on the shelf edges 118 of the shelf modules 110. Further, in the present example, the locations are defined relative to a reference feature on the support structure. More specifically, each display location is defined as an offset distance along a shelf edge 118 of a shelf module 110. The offset distance is defined from a side of the module 110 (e.g. the leftmost side of the module 110, also referred to as the boundary of the module 110). In other examples, various other reference features can be employed to define the locations in the label modification data, such as machine-readable markers (e.g. physical features of the shelf, graphical indicators such as QR codes, or the like) along the shelf edges, ends of a shelf edge 118 within the boundaries of a module 110 (e.g. when a shelf edge 118 does not extend along the full length 119 of the module 110), and the like.

Figure 5:
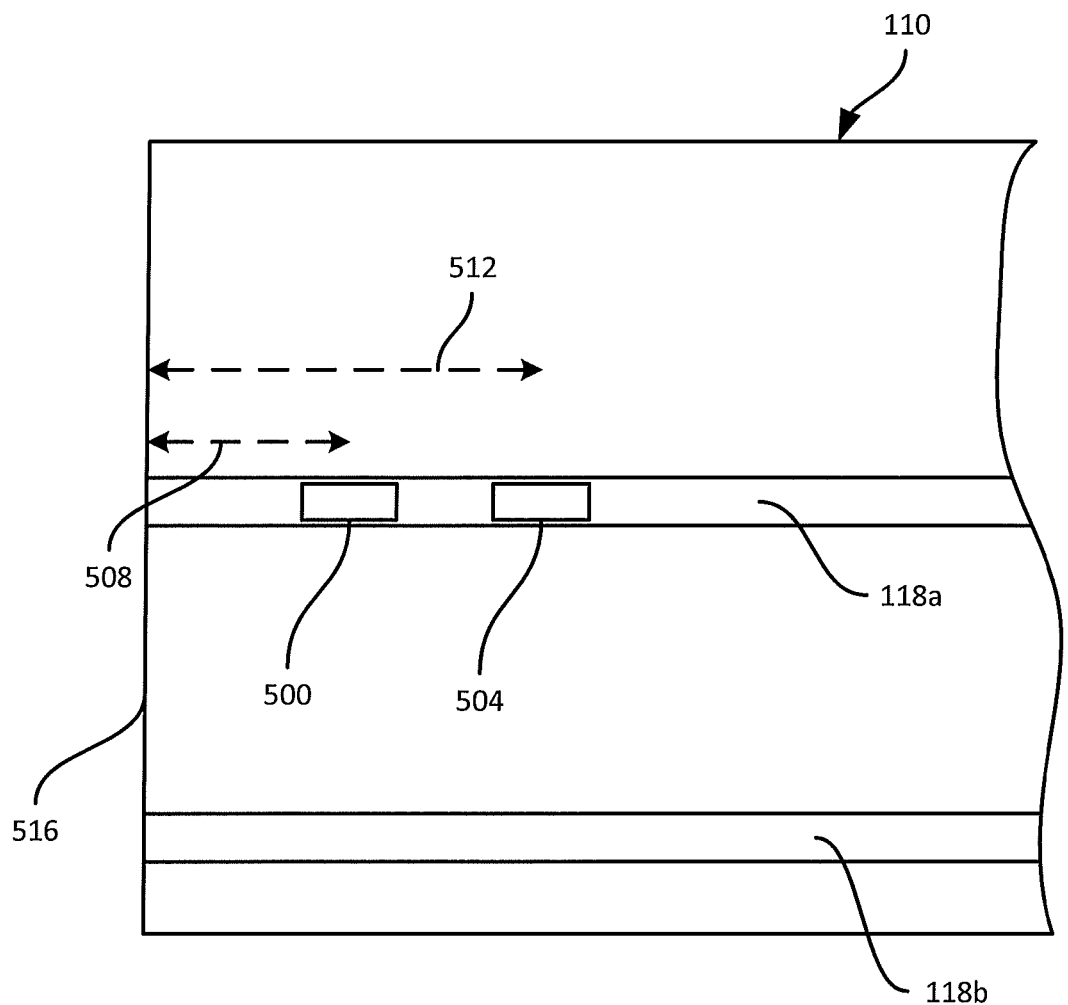
FIG. 5 is a diagram illustrating a support structure bearing low powered displays for modification through the method of FIG. 4.

Turning briefly to FIG. 5, a portion of an example shelf module 110 having upper and lower shelf edges 118a and 118b, respectively, is shown. The shelf edge 118a bears labels 500 and 504. The label 500 is at an offset 508 from a reference feature, in the form of a module boundary 516 (in the present example, the left side of the module 110), while the label 504 is at an offset 512 from the reference feature. The offsets 508 and 512, as well as indications of which shelf edge 118 the labels 500 and 504 are affixed to, can be stored in the repository 120 and obtained by the apparatus 103 at block 405, for storage in the repository 260. The label modification data obtained at block 405 therefore contains, in the present example, an identifier of a shelf module 110, an identifier of a shelf edge 118 of the identified module 110, and an offset distance along the identified shelf edge 118, from a predetermined reference feature of the identified module 110. The label modification data can also include content data, such as an image or other content displaying on the low powered display, or a product identifier permitting the apparatus 103 to retrieve or generate such content data. In some examples, the label modification data obtained at block 405 can also include an indication of the previous label to be modified (e.g. a product identifier or the like). Table 1, below, illustrates example label modification data obtained at block 405.

TABLE 1

Example Label Modification Data

| Module | Shelf edge | Offset (mm) | Product ID |
|--------|------------|-------------|------------|
| 110    | 118a       | 150         | 765554     |
| 110    | 118a       | 165         | 778633     |
| ...    | ...        | ...         | ...        |

As shown above, for each label to be modified, a location is provided (defined by the module and shelf edge identifiers, as well as the offsets). The product identifiers can be employed by the apparatus 103 to retrieve information with which to generate the content data.

Returning to FIG. 4, at block 410 the apparatus 103 is configured to navigate to the next support structure (e.g. the next module 110) identified in the label modification data. Navigation is performed via a suitable navigational mechanism, such as via the use of the above-mentioned map, navigational sensors of the apparatus 103, and the like. In the present example, the apparatus 103 is configured to navigate to a predetermined location relative to the module 110. For example, modules 110 may have lengths of about 1.5 m (other module lengths are also contemplated, for example from about 1 m to about 2 m), and the effector assembly 104 may have a reach of about 1 m.

Figure 6A:
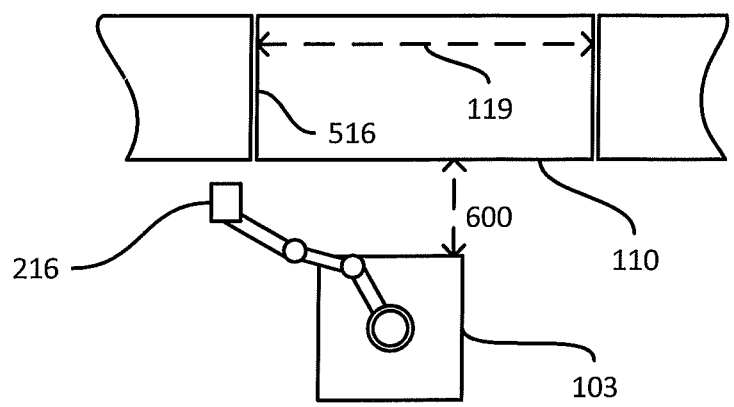
FIGS. 6A and 6B are diagrams illustrating detection of support structure reference features during performance of the method of FIG. 4.

Thus, the apparatus 103 is configured to navigate to a position at a predefined depth relative to the module 110, approximately half-way along the length 119 of the module 110, from which the effector assembly 104 can reach any portion of the shelf edges 118 of the module 110. FIG. 6A illustrates such a position, with the apparatus 103 having arrived at a depth 600 relative to the module 110, about half-way along the length 119 of the module. As seen in FIG. 6A, the apparatus 103 is not exactly half-way along the length 119. As will be apparent to those skilled in the art, localization based on inertial sensing (e.g. via accelerometers and gyroscopes), as well as localization based on odometry (e.g. via a wheel encoder coupled to the locomotive mechanism 204) may suffer from navigational errors, and the internal localization maintained by the apparatus 103 may therefore not align exactly with the true position of the apparatus 103 within the environment.

Returning to FIG. 4, at block 410 the apparatus 103 is also configured to place the modification unit 216 at an initial location, from which detection of the above-mentioned reference feature will be initiated. Positioning of the modification unit 216 is achieved via control of the effector assembly 104, for example by issuing commands from the processor 250 to the effector assembly 104 specifying coordinates (e.g. X, Y, Z coordinates and roll, pitch and yaw angles) that define a position and orientation of the modification unit 216 relative to the chassis 200. The effector assembly 104 includes positional sensors (not shown) configured to track the position of the second end (i.e. the modification unit 216) of the effector assembly 104 relative to the first end 212, enabling the effector assembly 104 to position the modification unit 216 responsive to the above-mentioned commands from the processor 250.

The initial location is selected based on the known position (in the frame of reference 102) of the shelf edge 118 identified in the label modification data, as well as on the predetermined position to which the apparatus 103 navigated at block 410, and on a navigational error boundary. For example, the navigational error mentioned above may have been previously characterized as reaching a maximum of about 0.1 m. Further, the height of the apparatus 103 and of the first end 212 of the effector assembly 104 on the apparatus 103 are previously determined, as is the height of the shelf edge 118a identified in the label modification data shown above. In the present example, the reference feature is the boundary 516, and the apparatus 103 is therefore configured to control the effector assembly 104 to place the modification unit 216 at an initial location at the height of the shelf edge 118a, at a horizontal position adjacent to the boundary 516. As a result of the potential for a positional error of up to 0.1 m, the modification unit 216 may be placed at a distance parallel to the length 119 of about 0.85 m (half of the length 119 plus the maximum potential navigational error of 0.1 m).

At block 415 the apparatus 103 is configured to control the image sensor 270 to capture an image. As shown in FIG. 6A, the modification unit 216 is positioned to orient the image sensor 270 towards the module 110. The image captured at block 415 therefore depicts a portion of the shelf edge 118a identified in the label modification data. At block 420 the apparatus 103 is configured to determine whether the reference feature is detected in the image captured at block 415. When the determination is negative, the apparatus 103 is configured to repeat the performance of blocks 415 and 420, incrementing the location of the modification unit 216 along the shelf edge 118a for each image capture. In other words, in the present example, in which the labels (i.e. the rewritable media bearing the labels) are affixed to substantially horizontal shelf edges 118, each incremental movement of the modification unit 216 at block 415 maintains the modification unit 216 at a predetermined height (e.g. the height of the shelf edge 118a as specified in the repository 120, the repository 260, or the label modification data itself) and changes the horizontal location by a predetermined increment to shift the field of view of the image sensor 270.

Figure 6B:
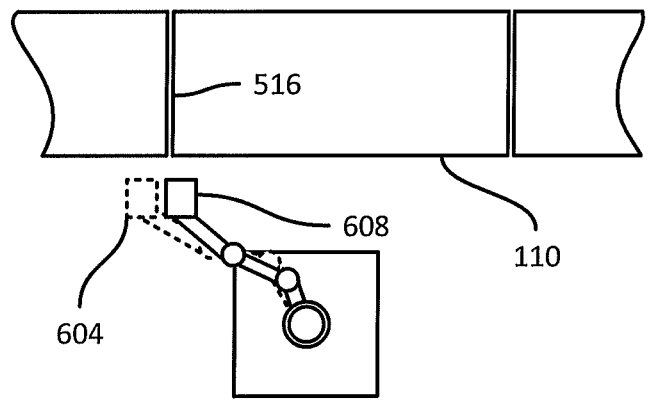
Figure 6C:
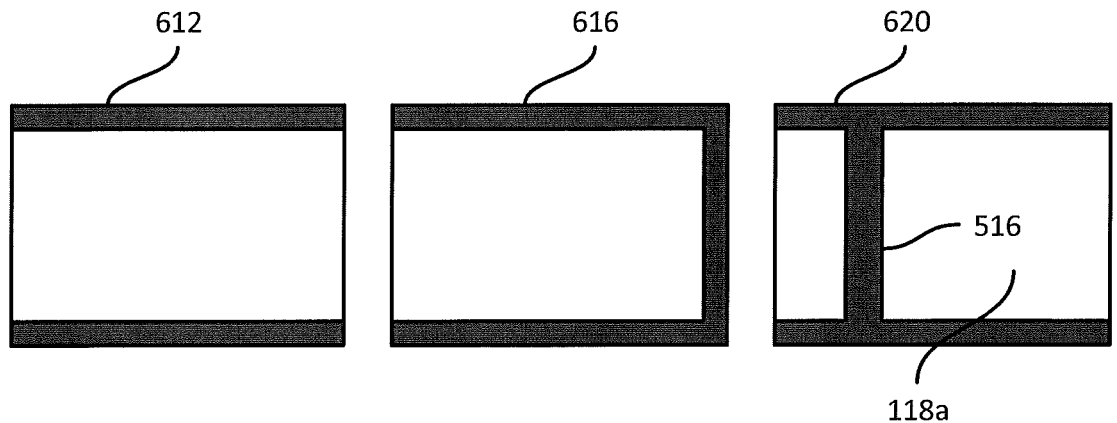
FIG. 6C is a diagram illustrating example images captured during the detection process illustrated in FIGS. 6A and 6B.

Referring to FIG. 6B, movement of the effector assembly 104 is illustrated, causing the modification unit 216 to traverse a portion of the shelf edge 118 from an initial position 604 (shown in FIG. 6A) to a further position 608. FIG. 6C shows a sequence of three images 612, 616 and 620 captured during the traverse shown in FIG. 6B. The determination at block 420, in the present example, includes determining whether the image captured at block 415 contains a substantially vertical gradient change (e.g. from light, to dark, and back to light) indicative of a gap between modules 110 (which indicates the presence of the module boundary 516). The determination includes the application of a suitable gradient detection operation, edge detection operation or the like. In the example images of FIG. 6C, the image 612 depicts a shelf edge of an adjacent module 110, and does not contain the boundary 516. The image 616 contains a partial representation of the gap between modules 110, but does not contain the boundary 516 (e.g. does not contain the complete dark-light-dark transition mentioned above). The image 620, meanwhile, contains a dark-light-dark transition representing the boundary 516. Responsive to capturing the image 620, therefore, the determination at block 420 is affirmative and the performance of the method 400 proceeds to block 425.

As will now be understood by those skilled in the art, the position of the image sensor 270 is fixed relative to the position of the modification unit 216. The image sensor 270 need not be centered relative to the modification unit 216, but the position of the image sensor 270 relative to the center of the modification unit 216, and in particular, the power transmitter 264 is nevertheless predetermined. Therefore, the location of a reference feature in an image captured by the image sensor 270 indicates the position of the image sensor itself (and therefore the position of the modification unit 216 and the power transmitter 264) relative to the reference feature.

At block 425, the apparatus 103 is configured to control the effector assembly 104 to place the modification unit 216 at the next location defined in the label modification data. In other words, having established the position of the modification unit 216 relative to the reference feature following an affirmative determination at block 420, the apparatus 103 is configured to move the effector assembly 104 to place the modification unit 216 at the specified offset relative to the reference feature. Taking the label modification data of Table 1 as an example, at block 425 the effector assembly 104 is controlled to place the modification unit 150 mm to the right (in the orientation shown in FIGS. 5, 6A and 6B) of the boundary 516. The location can represent, for example, the location of contacts of the low powered display for direct contact by the probes of the modification unit 216. In some examples, the location can represent an approximate location of the reception coil of the low powered display for wireless power and modification. In other examples, the location can represent a location at which the label modification unit 216 may be located to charge multiple displays simultaneously.

At block 430, the apparatus 103 is configured to modify a label at the location specified in the label modification data. The modification of a label at block 430 will be discussed in greater detail in connection with FIG. 7. At block 435, the apparatus 103 is configured to determine whether further labels remain to be modified on the current support structure (that is, the current module 110, to which the apparatus 103 navigated at block 410). The determination at block 435 is made with reference to the label modification data obtained at block 405. If all listed labels in the label modification data for the current module 110 have been modified, the determination at block 435 is negative. When the determination at block 435 is negative, the apparatus 103 proceeds to block 440. Otherwise, the apparatus 103 returns to block 425 to modify the next label for the current support structure.

At block 440, the apparatus 103 is configured to determine whether support structures other than the current support structure are identified in the label modification data and remain to be processed. In the example data shown in Table 1 above, only one module 110 is identified. In other examples, however, the label modification data can identify display locations on a plurality of distinct modules 110. When the determination at block 440 is affirmative, the apparatus 103 returns to block 410 to navigate to the next module 110 in the label modification data. As will now be apparent, during the performance of blocks 415 to 435, the apparatus 103 is configured to remain stationary relative to the current module 110. That is, although the effector assembly 104 and modification unit 216 move, the chassis 200 remains stationary relative to the module 110, thus mitigating or eliminating the accumulation of further navigational errors during the label modification process.

Figure 7:
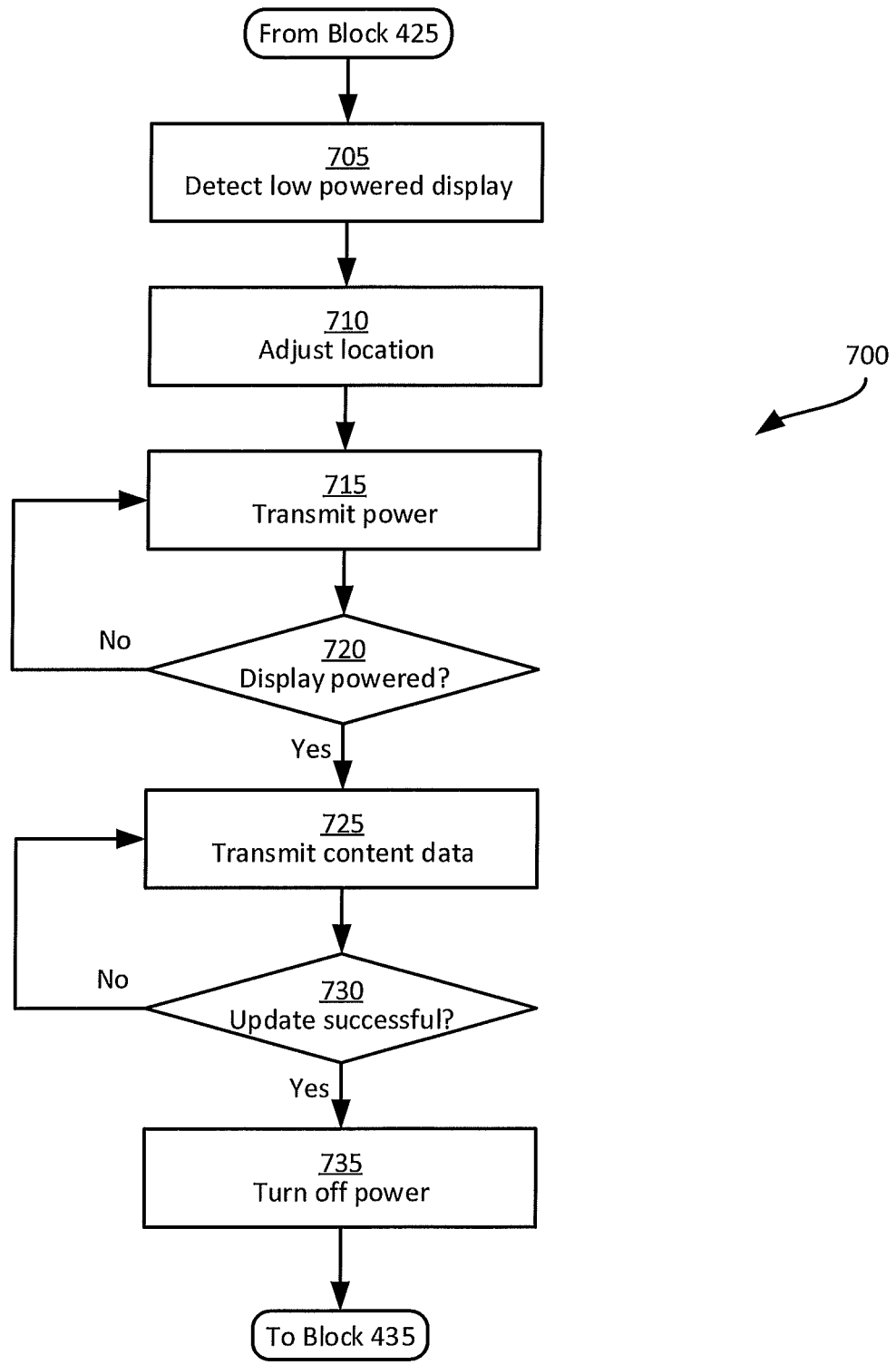
FIG. 7 is a flowchart of a method for low powered display modification.

Turning now to FIG. 7, the performance of block 430 will be discussed in greater detail. FIG. 7 illustrates a method 700 of label modification which will be described in conjunction with its performance in the system 100, and in particular by the apparatus 103, with reference to the components illustrated in FIGS. 2A, 2B, 3A and 3B.

Figure 8A:
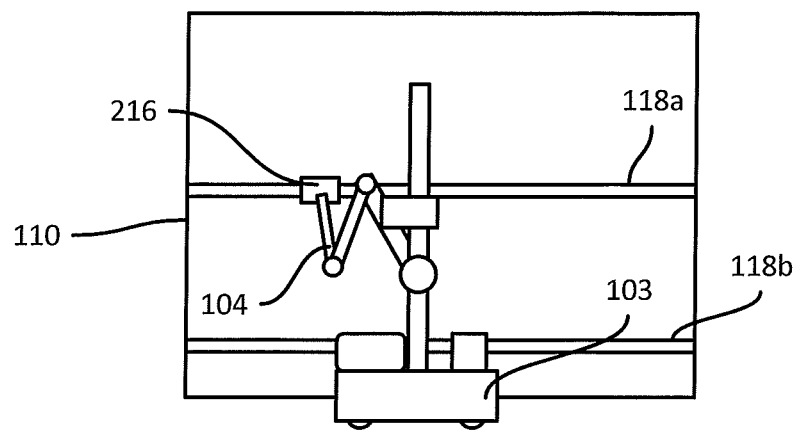
FIGS. 8A-8C are diagrams illustrating low powered display detection at block 705 of the method of FIG. 7.

At block 705, having controlled the effector assembly 104 to place the modification unit 216 at the next location at block 425 as shown in FIG. 8A, the apparatus 103 is configured to detect the low powered display, and in particular, a charging region of the low powered display at the location. Detection of the low powered display is achieved, in the present example, by controlling the image sensor 270 to capture one or more images of the shelf edge 118 from the current location of the modification unit 216 (i.e. the location specified in the label modification data). Detection of the low powered display can be performed via the detection of one or more edge features of the display (e.g. as indicated by gradient changes or the like), or the detection of contacts or one or more charging region indicators. In other examples, detection of the low powered display can include detection of the content data displayed, such as via the detection of a barcode or other label features such as strings of text in a captured image or the detection of one or more edge features of the displayed label.

At block 710, the processor 250 can be configured to increment the location of the modification unit 216 based on the features detected at block 705. For example, when a partial display is detected in an image captured at block 705, the processor 250 is configured to increment the location of the modification unit 216, for example to center the modification unit 216 over the partially detected display, or to center the modification unit 216 over a charging region of the detected display, and to then capture a further image via the image sensor 270 and repeat the detection. The processor 250 may process the captured image(s) and adjust the modification unit 216 according to explicit predefined algorithms (e.g. if the detected display is too low, move the modification unit 216 down), based on neural network approaches, or a combination of the above.

Figure 8B:
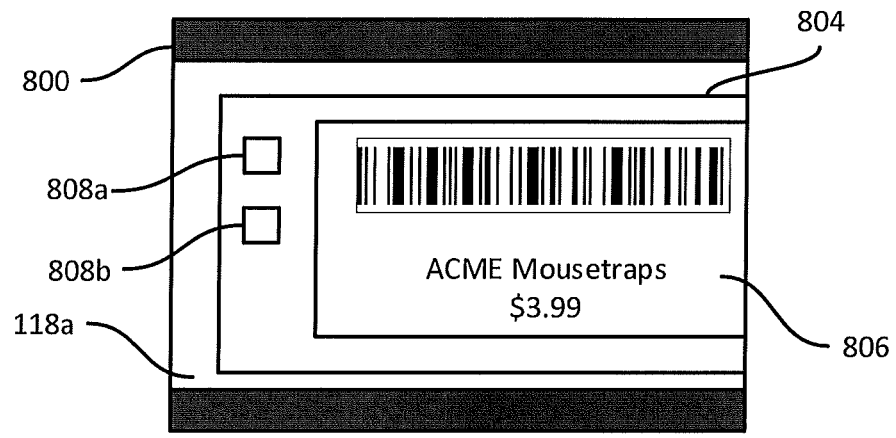
Figure 8C:
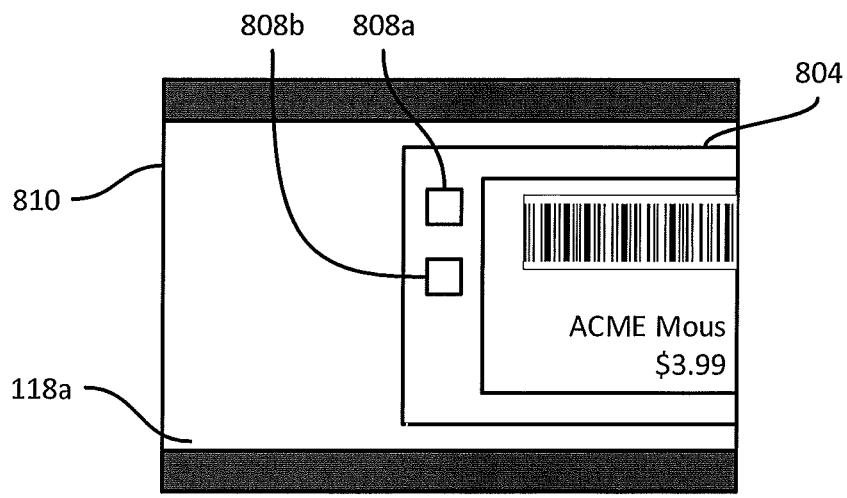

For example, referring to FIG. 8B, an example image 800 captured via the image sensor 270 is shown. The image 800 depicts a portion of the shelf edge 118a and a portion of a low powered display 804 displaying a label 806. The image 800 further depicts contacts 808a and 808b of the display 804 for charging via direct contact. The processor 250 can be configured to control the effector assembly 104 to move the modification unit 216 along the shelf edge 118a in the direction of the contacts 808 and to capture a further image. A further image 810 is shown in FIG. 8C, in which the contacts 808 are centered in the image. The processor 250, in other words, detects the contacts 808 as being coincident with the current position of the modification unit 216, and in particular, with the probes 352, and therefore suitable for being powered via the probes 352. When the modification unit 216 transmits power to the display 804 via direct contact, the processor 250 may be configured to iterate the detection and incrementing the location of the modification unit 216 until the contacts 808 are within a threshold distance from a target position. In other examples, such as when the modification unit 216 transmits power to the display 804 wirelessly, the threshold for the position of the charging region may be relaxed.

In particular, blocks 705 and 710 may be performed when the charging format is direct contact, and hence the modification unit 216, and in particular the power transmitter 264, are to be precisely located relative to the charging region of the low powered display. In other examples, the processor 250 can be configured to proceed directly to block 715. For example, the location stored in the label modification data may correspond to the offset of the charging region, and hence the modification unit 216 may be correctly positioned after having detected the reference feature.

In some examples, when wireless charging is employed, the modification unit 216 may be configured to transmit power to multiple displays simultaneously, hence a single charging region may be used for each of the multiple displays. The processor 250 can be configured determine an optimal charging location based on the display locations, for example based on machine learning algorithms or based on predetermined instructions (e.g. using a maximum threshold distance from each display). In other examples, the optimal charging location may be predetermined, and the location specified in the label modification data may be the optimal charging location for one or more displays.

Returning to FIG. 7, at block 715, the processor 250 is configured to transmit power to the low powered display. For example, when employing direct contact charging, the processor 250 can control the effector assembly 104 to extend the modification unit 216 towards the shelf edge 118a until one or more sensors (e.g. strain gauges or the like) in the effector assembly 104 register a threshold resistance indicating that the modification unit 216 has contacted the shelf edge 118a, and in particular, that the probes 352 have contacted the contacts of the display. The processor 250 is then configured to control the power supply 262 to supply power to the display.

When employing wireless charging, the processor 250 is configured to control the power supply 262 to apply an alternating current to the coil 302 to generate a magnetic field. In some examples, the processor 250 can further be configured to extend the modification unit 216 towards the shelf edge 118a by a predetermined distance, or by controlling the image sensor 270 to capture one or more images and process the captured image(s) to detect the shelf edge 118a to bring the modification unit 216 closer to the display to increase the efficiency of power transmission by the generated magnetic field. In some examples, the generated magnetic field may be sufficiently large to power multiple low powered displays simultaneously.

Figure 9:
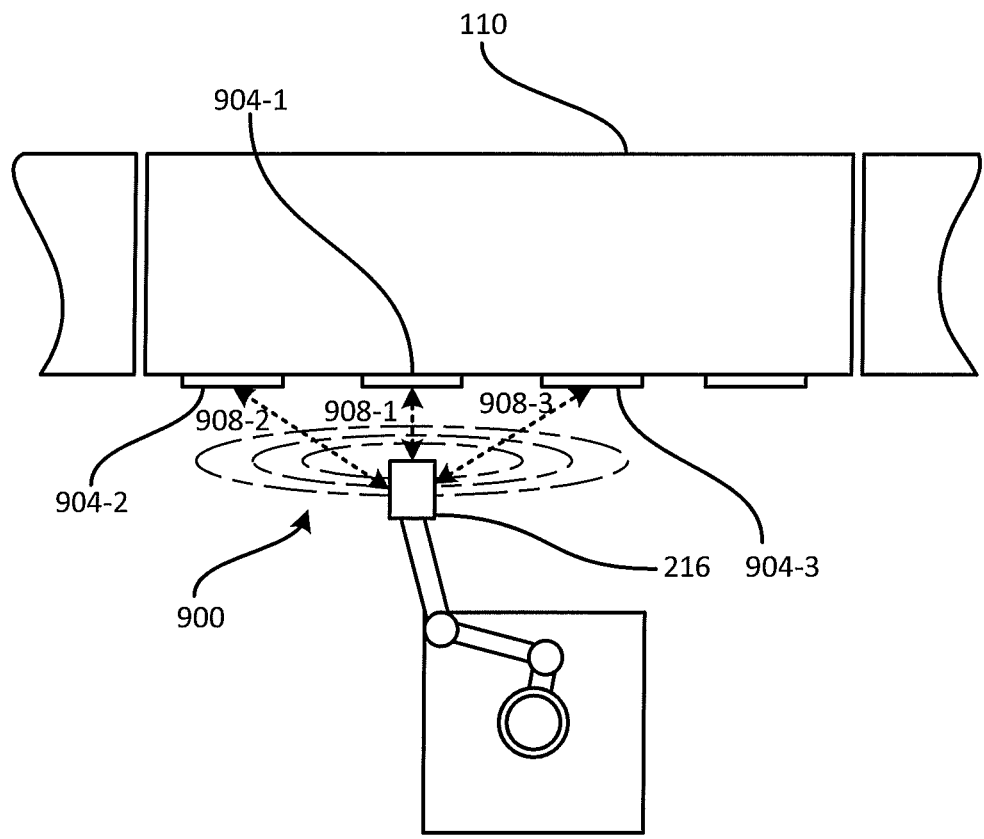
FIG. 9 is a diagram illustrating transmission of power and content data to multiple low powered displays during the performance of the method of FIG. 7.

For example, referring to FIG. 9, the modification unit 216 is located at a charging location and generates a magnetic field 900 for wirelessly charging low powered display 904-1. Based on the proximity of displays to the modification unit 216 and the size of the induced magnetic field 900, the modification unit 216 can simultaneously transmit power to further low powered displays, 904-2, and 904-3.

Returning to FIG. 7, t block 720, the processor 250 is configured to determine whether the display has been powered. For example, after a predetermined length of time, the processor 250 can communicate via a wireless communication protocol to confirm that the display is ready to receive content data. If the processor 250 determines that the display is not yet sufficiently powered (e.g. it receives no response, or receives a negative response), the processor 250 is configured to repeat the performance of block 715. For example, if the modification unit 216 was moved out of position or incorrectly positioned, block 715 may be repeated to reposition the modification unit 216, and in particular the power transmitter 264 with respect to the display. When the determination at block 720 is affirmative, the processor 250 is configured to proceed to block 725.

At block 725, the processor 250 is configured to transmit content data to the display. For example, the processor 250 can control the radio 304 to communicate with a respective radio of the display to transmit the content data. In some examples, the processor 250 can control the radio 304 to communicate with multiple low powered displays for updating multiple display simultaneously. Referring again to FIG. 9, the modification unit 216 communicates with the low powered display 904-1 via the wireless link 908-1 to modify the content displayed by the low powered display 904-1. In particular, the modification unit 216 transmits content data to the low powered display 904-1 via the link 908-1. Based on proximity of the displays to the modification unit 216 and the range of the respective radios, the modification unit 216 can communicate via the wireless links 908-2 and 908-3 to modify further content displayed by the further low powered displays 904-2 and 904-3 simultaneously with modifying the content displayed by the low powered display 904-1. In particular, the modification unit 216 transmits content data to the low powered displays 904-2 and 904-3 via the wireless links 908-2 and 908-3 respectively.

In other examples, when employing direct contact, the processor 250 can transmit the content data to the circuitry 354 to be sent to the low powered display via the probes 352. The content data can include, for example, clock data, content with which to update the display, and control instructions for updating the display.

At block 730, the processor 250 is configured to determine whether the display has been updated successfully. For example, after a predetermined length of time, the processor 250 can communicate via a wireless communication protocol to confirm that the display was updated successfully. If the processor 250 determines that the display was not updated successfully, the processor 250 is configured to repeat the performance of block 725. In some examples, the processor 250 may determine that multiple displays were successfully updated and record the updates, for example in the repository 260. Accordingly, at block 435, the processor 250 may skip displays for which the content was already modified. In other examples, the processor 250 can control the image sensor 270 to capture one or more images and process the image(s) to detect the content displayed on the low powered display. For example, the processor can detect a barcode or other label features to determine whether the display was updated successfully. When the determination at block 730 is affirmative, the processor is configured to proceed to block 735.

At block 735, having successfully updated the low powered display, the processor 250 is configured to control the power supply 262 to turn off the power and proceed to block 435 of the method 400. For example, the processor 250 can control the power supply 262 to stop supplying power to the power transmitter 264, and the effector assembly 104 to move the modification unit 216 away from the low powered display.

Variations to the above systems and methods are contemplated. For example, in some embodiments, the performance of block 410 of the method 400 includes only placement of the modification unit 216 at an initial location, without navigating to a support structure. In such embodiments, the apparatus 103 may lack a controllable locomotive mechanism, and may instead be moved to the support structure by an operator. Following arrival at the support structure, the operator may activate an input on the apparatus 103 to initiate the performance of block 410 (that is, the control of the modification unit 216).

In another embodiment, the low powered display can be configured to obtain the content data from the server 101, the client device 105, or another access point via a communication link 107. In particular, the low powered display can receive power from the modification unit 216 to power a communications interface to download the content data. Accordingly, the processor 250 can be configured to proceed directly from block 720 to block 730, without transmitting content data to the display.

In a further embodiment, the low powered display can be a smart label including one or more sensors to collect data for transmission to the label modification unit or to the server 101. In particular, at block 725, in addition to or instead of transmitting content data to the smart label, the label modification unit 216 may receive collected sensor data from the smart label. The modification unit 216 can store the collected sensor data in the repository 260 for further processing, such as subsequent transmission to the server 101. In other examples, upon receiving power from the modification unit 216 at block 715, the smart label can be configured to transmit the collected sensor data directly to the server 101, for example via the radio 314. More generally, the label modification unit can transmit power to and receive collected data from other types of sensors, including sensors which do not include label display applications or properties.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An apparatus for labeling support structures, comprising:
   a chassis having a locomotive assembly;
   an effector assembly having a first end coupled to the chassis and a second end movable relative to the chassis;
   a label modification unit at the second end of the effector assembly, the label modification unit including an image sensor; and
   a controller coupled to the locomotive assembly, the effector assembly and the label modification unit, the controller configured to:
      obtain label modification data defining a location of a low powered display relative to a reference feature on a support structure for modifying content displayed by the low powered display;
      control the locomotive assembly to travel to the support structure;
      detect the reference feature via image data captured at the image sensor;
      control the effector assembly to place the label modification unit at the location relative to the reference feature; and
      control the effector assembly and the label modification unit to modify content displayed by the low powered display.

2. The apparatus of claim 1, wherein the effector assembly is a robotic arm.

3. The apparatus of claim 2, further comprising a mast extending upwards from the chassis; wherein the robotic arm is supported at the first end on the mast.

4. The apparatus of claim 1, wherein modifying the low powered display comprises:
   transmitting power to the low powered display and transmitting content data to the low powered display.

5. The apparatus of claim 4, wherein the apparatus comprises:
   a power supply to supply power; and
   a power transmitter coupled to the power supply, the power transmitter configured to transmit power from the power supply to a receiver of the low powered display.

6. The apparatus of claim 5, wherein the power transmitter is further configured to transmit the content data to the low powered display.

7. The apparatus of claim 5, further comprising a radio coupled to the controller, the radio configured to transmit the content data to the low powered display.

8. The apparatus of claim 5, wherein the transmitter comprises probes extending from the label modification unit, the probes configured to mate with contacts of the low powered display to transmit the power to the low powered display.

9. The apparatus of claim 5, wherein the transmitter comprises a coil, and wherein the controller is configured to control the power supply to apply an alternating current to the coil to induce a magnetic field to wirelessly transmit power to the low powered display.

10. The apparatus of claim 9, wherein the modification unit transmits power to at least a further low powered display via the induced magnetic field, and wherein the controller is configured to control the label modification unit to modify further content displayed by the further low powered display simultaneously with modifying the content displayed by the low powered display.

11. The apparatus of claim 1, wherein the support structure includes a shelf module including a label-bearing shelf edge; and wherein the reference feature is a boundary of the shelf module; and
   wherein the controller is configured to detect the reference feature by:
      controlling the effector assembly to position the label modification unit at an initial location relative to the shelf module;
      capturing, via the image sensor, an image of the shelf module; and
      detecting the module boundary in the image.

12. The apparatus of claim 11, wherein the controller is further configured to detect the module boundary in the image by detecting a sequence of gradient changes in the image.

13. The apparatus of claim 1, wherein the controller is further configured to control the label modification unit to receive collected sensor data from the low powered display.

14. A method of modifying low powered displays on support structures, comprising:
   at a controller of an apparatus:
      obtaining label modification data defining a location of a low powered display relative to a reference feature on a support structure for modifying content displayed by the low powered display;
      controlling a locomotive assembly of the apparatus to travel to the support structure;
      detecting the reference feature in an image captured at an image sensor of the apparatus;
      controlling an effector assembly of the apparatus to place a label modification unit at the location relative to the reference feature; and controlling effector assembly and the label modification unit to modify content displayed by the low powered display.

15. The method of claim 14, wherein controlling the effector assembly and label modification unit to modify content displayed by the low powered display comprises transmitting power to the low powered display and transmitting content data to the low powered display.

16. The method of claim 15, wherein transmitting power to the low powered display comprises controlling a power transmitter of the label modification unit to transmit power from a power supply of the apparatus to a receiver of the low powered display.

17. The method of claim 16, wherein transmitting content data to the low powered display comprises controlling the power transmitter to further transmit the content data.

18. The method of claim 16, wherein transmitting content data to the low powered display comprises controlling a radio of the modification unit to transmit the content data.

19. The method of claim 16, wherein the power transmitter comprises probes extending from the label modification unit, the probes configured to mate with contacts of the low powered display to transmit the power to the low powered display.

20. The method of claim 16, wherein the transmitter comprises a coil, and wherein transmitting power comprises controlling the power supply to apply an alternating current to the coil to induce a magnetic field to wirelessly transmit power to the low powered display.

21. The method of claim 20, further comprising:
transmitting power to at least a further low powered display via the induced magnetic field; and
modifying further content displayed by the further low powered display simultaneously with modifying the content displayed by the low powered display.

22. The method of claim 14, wherein the support structure includes a shelf module including a label-bearing shelf edge; wherein the reference feature is a boundary of the shelf module; and wherein detecting the reference feature comprises, at the controller:
controlling the effector assembly to position the label modification unit at an initial location relative to the shelf module;
capturing, via the image sensor, an image of the shelf module; and
detecting the module boundary in the image.

23. The method of claim 22, further comprising, at the controller, detecting the module boundary in the image by detecting a sequence of gradient changes in the image.

24. The method of claim 14, further comprising receiving collected sensor data from the low powered display.

* * * * *